United States Patent [19]

Chennakeshu

[11] Patent Number: 5,020,056
[45] Date of Patent: May 28, 1991

[54] REDUCTION OF SYNCHRONOUS FADING EFFECTS BY TIME HOPPING OF USER SLOTS IN TDMA FRAMES

[75] Inventor: Sandeep Chennakeshu, Clifton Park, N.Y.

[73] Assignee: General Electric Company, Schenectady, N.Y.

[21] Appl. No.: 346,760

[22] Filed: May 2, 1989

[51] Int. Cl.$^5$ .................................................. H04J 3/16
[52] U.S. Cl. .................................. 370/95.3; 370/95.1; 455/52
[58] Field of Search ........................ 370/68, 95.1, 95.2, 370/95.3, 13, 17, 93, 79, 80, 81, 104.1, 110.1, 18, 1, 4; 455/52, 63

[56] References Cited

U.S. PATENT DOCUMENTS

| | | | |
|---|---|---|---|
| 3,499,995 | 3/1970 | Clark | 370/93 |
| 4,215,244 | 7/1980 | Gutleber | 370/93 |
| 4,641,304 | 3/1987 | Raychaudhuri | 370/93 |
| 4,686,670 | 8/1987 | Kessels et al. | 370/68 |
| 4,745,599 | 5/1988 | Raychaudhuri | 370/93 |
| 4,785,450 | 11/1988 | Bolgiano et al. | 370/95.1 |

Primary Examiner—Douglas W. Olms
Assistant Examiner—Wellington Chin
Attorney, Agent, or Firm—Marvin Snyder; James C. Davis, Jr.; Lawrence P. Zale

[57] ABSTRACT

A method for the reduction of synchronous fading effects in a time-diversity multiple-access communications system, in which the data to/from a particular user is to appear in a particular assigned slot, varies the position of the time slot assigned to that particular user, so that the slot has a different position in each successive frame in which that assigned slot appears. The position may be set relative to a frame feature, such as its start time and the like. Selected-schedule patterns may be used, with the pattern either being preset at the various stations or being sent to the stations prior to use, as part of a preamble, in-band supervisory signaling and the like.

8 Claims, 1 Drawing Sheet

REDUCTION OF SYNCHRONOUS FADING EFFECTS BY TIME HOPPING OF USER SLOTS IN TDMA FRAMES

BACKGROUND OF THE INVENTION

The present application relates to communication systems and, more particularly, to a novel method for the reduction of synchronous fading effects in a time-diversity multiple-access (TDMA) communications system.

In a communications system environment, such as a mobile radio channel, a fade is said to have occurred if the received signal envelope drops below some predefined acceptable level. Synchronous fading is that situation where a plurality of signal fades occur with a relatively constant time periodicity, as, for example, may be related to speed of the vehicle in which the receiving radio telephone is carried. In such a synchronous fading situation, the signals received from a central station experience periodic fading at fairly constant time intervals and pose a serious problem if the fading occurs synchronously with the occurrence of the particular time slot, or an integral multiple of time slot occurrences, in which data for that particular channel is transferred such that the transmissions to/from a particular user suffer degradation and cannot be mitigated by interpolation techniques, techniques using forward error correction codes, or other high overhead error correction techniques. It is therefore highly desirable to provide a method for the reduction of synchronous fading effects, particularly in a TDMA communication system.

BRIEF SUMMARY OF THE INVENTION

In accordance with the invention, a method for the reduction of synchronous fading effects in a time-diversity multiple-access communications system, in which the data to/from a particular user is to appear in a particular assigned slot, utilizes the step of: varying the position of the time slot, assigned to that particular user, to have a different position in each successive frame in which that assigned slot appears; the position may be set relative to a frame feature, such as its start time and the like. Selected-schedule patterns may be used, with the pattern either being preset at the various stations or being sent to the stations prior to use, as part of a slot preamble and the like.

Accordingly, it is an object of the present invention to provide a novel method for reduction of synchronous fading effects by time-hopping user slots in successive frames of a TDMA communications system.

This and other objects of the present invention will become apparent upon a reading of the following detailed description, when considered in conjunction with the associated figures.

DETAILED DESCRIPTION OF THE PRESENT INVENTION

Figure 1A:
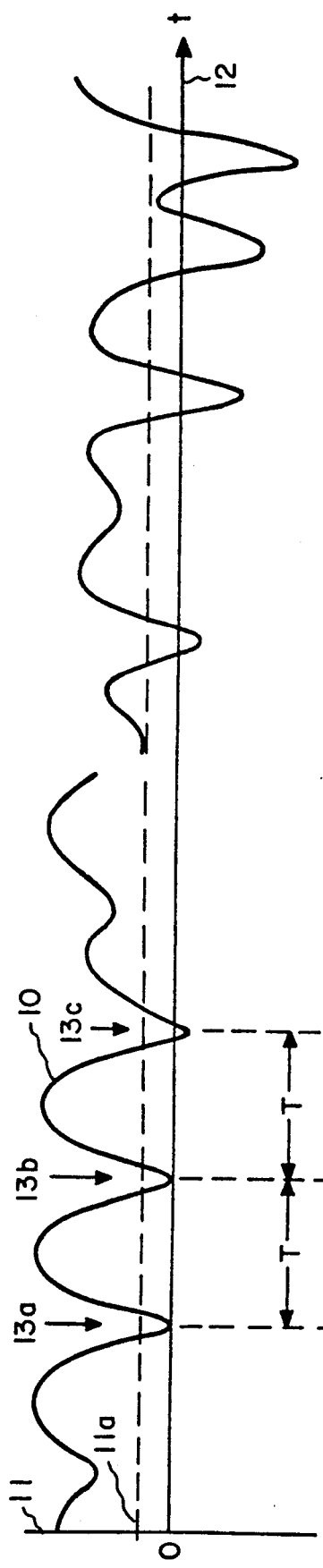
FIG. 1a is a graph illustrating the received signal level versus time, at a mobile receiver, in a typical TDMA radio communications system.

Referring initially to FIG. 1a, a signal 10, received at a mobile station in a time-diversity multiple-access (TDMA) system, is graphed, with amplitude indicated along ordinate 11, for increasing time along ordinate 12. The signal is provided by a stationary main transmitter. It is well known that fading occurs due to many different situations, with a fade being defined as the reduction of the level of received signal envelope 10 below some acceptable level 11a, such as occurs at fade troughs 13a, 13b and 13c. Thus, the transmitted signal, which may be reflected from various objects in the terrain and the like, may have these reflected signals arrange themselves in some form of standing wave pattern, with the standing wave pattern comprising the series of troughs 13 in the signal level 10. When a mobile receiver passes through each of signal troughs 13a, 13b, 13c, . . . , the signal falls below the minimum signal level 11a at which satisfactory data recovery can take place and a fade occurs. Therefore, successive fades will occur at each of the troughs 13a, 13b, 13c, . . . with the average fade duration and the interval between successive fades depending on factors such as antenna pattern, threshold level, carrier frequency, vehicle speed, and the like. Of primary interest are the vehicle-speed-related synchronous fades which occur with a relatively constant time periodicity T related to the vehicle speed. In such a situation, the received signal level 10 experiences each of fades 13 with fairly constant time intervals T therebetween.

Figure 1B:
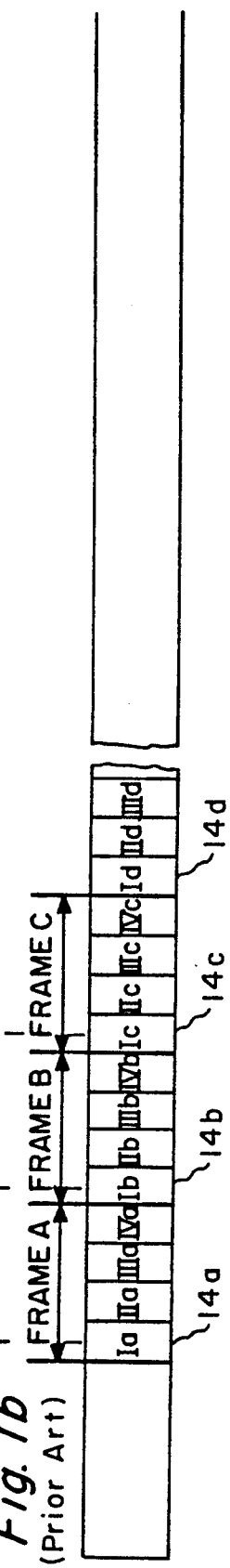
FIG. 1b is a time-synchronized graph of user slot assignments in a prior art system, illustrating the problem to be solved.

Referring now to FIGS. 1a and 1b, in the prior art TDMA system, each user (such as user I) is assigned a time slot during which the user can send or receive data. Several users have their time slots arranged in a time-aligned pattern which forms a frame (which may have, e.g., 3-10 user slots). As illustrated, each of the consecutive frames A, B, C, . . . has four users I, II, III and IV, with the first user having the first slot in each of a succession of frames, e.g. the first slot 14a in the first frame, the first slot 14b in the second frame, the first slot 14c in the third frame and so on. It will be seen that, if the first user always has the first slot in each sequential frame, then there will be a problem if a fade 13a, 13b, 13c, . . . occurs substantially simultaneously with the occurrence of the particular time slot (e.g. slots 1a, 1b, 1c, . . .) of the particular user (e.g. user I), or at an integral multiple of the time between successive occurrences of the same slot. In fact, it will be seen that synchronous fading of a most severe type occurs if fades 13a, 13b, 13c, . . . each occur with a periodicity such that the time T therebetween is essentially equal to the periodicity of the frame, which frame periodicity is the time between the successive occurrences of each slot in consecutive frames. These synchronous mobile channel signal fades produce burst errors which, while normally mitigated by use of high overhead forward error corrective code and other fade-combatant interpolation techniques, will have a loss of data if every user slot in a succession of frames is affected by a fade.

Figure 1C:
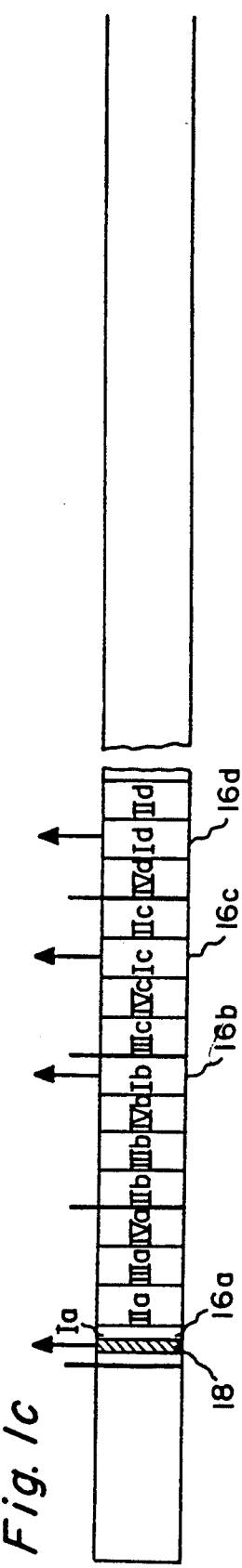
FIG. 1c is a time-synchronized graph of a like plurality of frames of a TDMA system utilizing the method of the present invention for avoiding synchronous fading data loss.

Referring now to FIGS. 1a and 1c, in accordance with my invention, synchronous fading is avoided if the time slots in each frame are sent in a non-fixed user order, and are switched according to some predetermined, i.e. non-random, pattern so that the probability of the same slot being subjected to a synchronous fade in successive frames is lowered. Thus, a particular user (e.g. user I) is assigned the first user slot 16a in the first frame A, but is not placed in the same first slot in each of the subsequent frames. Instead, in frame B, the first user slot 1b is the last slot 16b and is some other slot in subsequent frames, such as the third slot 16c in frame C, the second slot 16d in the next frame, and so forth, in accordance with some predetermined pattern. Here, this pattern is the cyclic shifting of the first user slot by one slot to the left in each successive frame, with wrap-around to the last slot in a next frame, after a frame in which the first slot is used. The effective result is that only in one time slot, i.e. slot 16a, is the first user subjected to one of fades 13 (e.g. fade 13a). Utilizing this time-slot-hopping method of slot variation to switched slot assignments will tend to break down any synchronous fade pattern which might be present and turns that pattern into an asynchronous pattern with reference to a particular user slot over a relatively short time interval. It will be seen that there is, in the example, still some degree of periodicity in the sequence of the second slot 16b, third slot 16c, fourth slot 16d, and so forth, until the user attains the first slot in a frame, and then rolls to the last slot in the next subsequent frame to break the pattern. Even this degree of periodicity can be removed by generating a preselected pattern which is deliberately designed to remove synchronisity. It will be understood that this pattern is predetermined, for the particular communication system, so that the base station and the mobile stations are all pre-informed of the time-slot-hopping pattern to be utilized and are thus maintained in time alignment during the data exchange, so that the time hopping procedure is user transparent. The particular pattern to be utilized and/or frame time synchronization information for carrying out framing procedures, can be provided in a data preamble transmission 18a at the start of each of a plurality of superframes 18 in each slot or as signaling information transmitted in either slow or fast associated control channel modes. It will be seen that the exact manner of hopping between slots will depend upon the particular TDMA channel structure utilized, which will include such factors as: frame length; data rate; slot quantities, number of users per frame; and system factors, such as antenna diversity switching ability, mobile-assisted hand-off and time alignment, presence of techniques such as synthetic regeneration, automatic repeat request, and the like.

While one presently preferred embodiment of my novel method for reduction of synchronous fading effects by time-hopping user slot assignments in time-diversity, multiple-access framed communication systems, is described in detail herein, many modifications and variations will now become apparent to those skilled in the art. It is my intent, therefore, to be limited only by the scope of the appending claims, and not by the specific details provided by way of explanation of the this presently preferred embodiment.

What is claimed is:

1. A method for reduction of synchronous fading in a TDMA communications system, comprising the steps of:
   assigning each user to a time slot in which data to or from that user appears; and
   varying the position of the time slot assigned to that particular user to be in a different part of each successive frame.

2. The method of claim 1, wherein the part of the frame in which the particular user time slot appears is varied according to a predetermined pattern.

3. The method of claim 2, wherein the pattern is a selected schedule pattern.

4. The method of claim 2, wherein the pattern is preset into the user station.

5. The method of claim 2, wherein the pattern is sent to the user station as slow associated control channel data prior to use.

6. The method of claim 2, wherein the pattern is sent as part of a slot preamble.

7. The method of claim 2, wherein the pattern is sent to the user station as fast associated control channel data.

8. The method of claim 2, wherein the pattern is selected to reduce the probability of the same time slot being subjected to synchronous fading in successive frames.

* * * * *